United States Patent
Shigemitsu

(10) Patent No.: US 9,345,933 B2
(45) Date of Patent: *May 24, 2016

(54) MULTI-PIECE GOLF BALL

(71) Applicant: DUNLOP SPORTS CO., LTD., Kobe-shi, Hyogo (JP)

(72) Inventor: Takahiro Shigemitsu, Kobe (JP)

(73) Assignee: DUNLOP SPORTS CO. LTD., Kobe-Shi (JP)

( * ) Notice: Subject to any disclaimer, the term of this patent is extended or adjusted under 35 U.S.C. 154(b) by 68 days.

This patent is subject to a terminal disclaimer.

(21) Appl. No.: 13/728,523

(22) Filed: Dec. 27, 2012

(65) Prior Publication Data

US 2013/0172116 A1 Jul. 4, 2013

(30) Foreign Application Priority Data

Dec. 28, 2011 (JP) ................................. 2011-289987

(51) Int. Cl.
*C08K 5/098* (2006.01)
*A63B 37/00* (2006.01)
*C08L 23/08* (2006.01)

(52) U.S. Cl.
CPC ........... *A63B 37/0076* (2013.01); *A63B 37/006* (2013.01); *A63B 37/0045* (2013.01); *A63B 37/0051* (2013.01); *A63B 37/0059* (2013.01); *A63B 37/0062* (2013.01); *A63B 37/0064* (2013.01); *A63B 37/0075* (2013.01); *A63B 37/0092* (2013.01); *C08K 5/098* (2013.01); *C08L 23/0876* (2013.01)

(58) Field of Classification Search
None
See application file for complete search history.

(56) References Cited

U.S. PATENT DOCUMENTS

| | | | |
|---|---|---|---|
| 5,306,760 A | 4/1994 | Sullivan | |
| 5,312,857 A | 5/1994 | Sullivan | |
| 6,100,321 A * | 8/2000 | Chen | 524/400 |
| 6,329,458 B1 | 12/2001 | Takesue et al. | |
| 7,803,861 B1 * | 9/2010 | Binette | 524/322 |
| 2001/0018375 A1 | 8/2001 | Hayashi et al. | |
| 2002/0099120 A1 | 7/2002 | Takesue et al. | |
| 2005/0267240 A1 * | 12/2005 | Chen | 524/322 |
| 2010/0216572 A1 * | 8/2010 | Umezawa et al. | 473/373 |
| 2010/0216574 A1 | 8/2010 | Umezawa et al. | |
| 2011/0275456 A1 * | 11/2011 | Sullivan et al. | 473/373 |
| 2013/0172109 A1 * | 7/2013 | Shiga et al. | 473/372 |
| 2013/0172110 A1 * | 7/2013 | Shiga et al. | 473/372 |

FOREIGN PATENT DOCUMENTS

| | | |
|---|---|---|
| JP | 4-208246 A | 7/1992 |
| JP | 6-292740 A | 10/1994 |
| JP | 7-292068 A | 11/1995 |
| JP | 2000-157646 A | 6/2000 |
| JP | 2001-218873 A | 8/2001 |
| JP | 2002-219195 A | 8/2002 |
| JP | 2010-194314 A | 9/2010 |
| WO | WO 94/24204 A2 | 10/1994 |

OTHER PUBLICATIONS

English translation of the Notice of Reasons for Rejection dated Aug. 4, 2015 for Japanese Application No. 2011-289987.

* cited by examiner

*Primary Examiner* — David Buttner
(74) *Attorney, Agent, or Firm* — Birch, Stewart, Kolasch & Birch, LLP

(57) ABSTRACT

A multi-piece golf ball excellent in resilience and controllability includes a core composed of a center and an envelope layer covering the center and at least one cover covering the core, wherein the center is formed from a center composition containing (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of the binary copolymer, (a-3) a ternary copolymer composed of the binary copolymer components and an β,β-unsaturated carboxylic acid ester, and (a-4) an ionomer resin consisting of a metal ion-neutralized product of the ternary copolymer components and (B) a basic metal salt of a fatty acid, and wherein the envelope layer is formed from a rubber composition.

14 Claims, No Drawings

MULTI-PIECE GOLF BALL

FIELD OF THE INVENTION

The present invention relates to an improvement in resilience of a multi-piece golf ball.

DESCRIPTION OF THE RELATED ART

As a golf ball construction, a two-piece golf ball comprising a core and a cover, a three-piece golf ball comprising a core, a single-layered intermediate layer covering the core, and a cover covering the intermediate layer, and a multi-piece golf ball comprising a core, at least two intermediate layers covering the core, and a cover covering the intermediate layers are known. Ionomer resins are used as materials constituting each layer of golf balls. Use of the ionomer resins as the constituent member of the golf ball provides the golf ball traveling a great distance, because of its high stiffness. Accordingly, ionomer resins are widely used as a material constituting a cover or an intermediate layer of the golf ball. However, there still remains a room for further improvement with respect to the stiffness and fluidity thereof and various improvements have been proposed for improving these properties.

Japanese Patent Publication No. 2000-157646 A discloses a golf ball cover composition having a melt index (MI) of 1 dg/sec. or more and primarily comprising a mixture of a base resin, blended with (d) a metal soap obtained by neutralizing an organic acid having up to 29 carbon atoms with a monovalent to trivalent metal ion, in a mass ratio of the base resin to the metal soap being 95:5 to 80:20, wherein the base resin comprises an ionomer resin component containing (a) a ternary ionomer resin consisting of a metal ion neutralized product of an olefin-unsaturated carboxylic acid-unsaturated carboxylate copolymer having an acid content of 12 wt % or less, and (b) a binary ionomer resin consisting of a metal ion neutralized product of an olefin-unsaturated carboxylic acid copolymer having an acid content of 15 wt % or less in a ratio of 40:60 to 100:0; and (c) an unneutralized random copolymer composed of an olefin and an unsaturated carboxylic acid monomer, in a mass ratio of the ionomer resin component to (c) the unneutralized random copolymer being 75:25 to 100:0.

U.S. Pat. No. 5,306,760 discloses a golf ball comprising a core and a cover, wherein the cover consists essentially of 100 parts by weight of at least one ionomer resin and from about 25 to about 100 parts by weight of a metal stearate, wherein said ionomer resin is the reaction product of an olefin having 2 to 8 carbon atoms and an unsaturated monocarboxylic acid having 3 to 8 carbon atoms.

U.S. Pat. No. 5,312,857 discloses a golf ball comprising a core and a cover, wherein the cover consists essentially of 100 parts by weight of at least one ionomer resin and from about 25 to about 100 parts by weight of a fatty acid metal salt, wherein said ionomer resin is the reaction product of an olefin having 2 to 8 carbon atoms and an unsaturated monocarboxylic acid having 3 to 8 carbon atoms.

Japanese Patent Publication No. H06-292740 A discloses a composition for a golf ball cover material which comprises (A) 15 to 90 parts by weight of metal salts of an ethylene/unsaturated carboxylic acid copolymer having an acid content of 10 to 30% by weight and a degree of neutralization of at least of 25 mole % and (B) 85 to 10 parts by weight of an ethylene/(meth)acrylate ester/unsaturated carboxylic acid terpolymer having a (meth)acrylate ester content of 12 to 45% by weight and an unsaturated carboxylic acid content of 0.5 to 5% by weight.

Japanese Patent Publication No. 2001-218873 A discloses a multi-piece golf ball comprising a solid core, an intermediate layer enclosing the solid core, and a cover enclosing the intermediate layer, wherein at least one of said intermediate layer and said cover is formed of a heated mixture comprising (a) 100 parts by weight of an olefin-unsaturated carboxylic acid random copolymer or an olefin-unsaturated carboxylic acid-unsaturated carboxylate random copolymer or both of them, (b) 5 to 80 parts by weight of a fatty acid having a molecular weight of at least 280 or a derivative thereof, and (c) 0.1 to 10 parts by weight of a basic inorganic metal compound capable of neutralizing acid groups in components (a) and (b), said heated mixture having a melt index of at least 1.0 dg/min, and wherein said intermediate layer has a Shore D hardness of 40 to 63, said cover has a Shore D hardness of 45 to 68, and the Shore D hardness of said solid core at its center is not greater than the Shore D hardness of said intermediate layer, which is not greater than the Shore D hardness of said cover.

Japanese Patent Publication No. 2002-219195 A discloses a golf ball material comprising a mixture which is composed of essential components: 100 pars by weight of a resinous component consisting of a base resin and (e) a non-ionomer thermoplastic elastomer, the base resin and the elastomer being blended in a weight ratio of 100:0 to 50:50; (c) 5 to 80 parts by weight of a fatty acid and/or fatty acid derivative having a molecular weight of 280 to 1,500; and (d) 0.1 to 10 parts by weight of a basic inorganic metal compound capable of neutralizing acidic groups left unneutralized in the base resin and component (c), wherein the base resin has (a) an olefin-unsaturated carboxylic acid binary random copolymer and/or a metal ion-neutralized olefin-unsaturated carboxylic acid binary random copolymer, blended with (b) an olefin-unsaturated carboxylic acid-unsaturated carboxylate ternary random copolymer and/or a metal ion neutralized olefin-unsaturated carboxylic acid-unsaturated carboxylate ternary random copolymer, in a weight ratio of 100:0 to 25:75.

SUMMARY OF THE INVENTION

As a method to improve a flight distance of a golf ball using an ionomer resin with a high stiffness for a constituent member, there is a method to use an ionomer resin having a high degree of neutralization. However, since the ionomer resin having a high degree of neutralization has a low fluidity, for example, injection molding a thin cover or intermediate layer is extremely difficult. As a method of improving the fluidity of the ionomer resin, a fatty acid or a metal salt thereof are added to the ionomer resin having a high degree of neutralization. However, if the added amount is a certain amount or less, the effect of improving the fluidity is low, while if the added amount is a certain amount or more, the mechanical properties of the material are lowered, which causes a problem of the lower durability of the golf ball.

The present invention has been achieved in view of the above circumstances. An object of the present invention is to provide a multi-piece golf ball excellent in resilience and controllability in a golf ball using an ionomer resin.

The present invention provides a multi-piece golf ball comprising a core composed of a center and an envelope layer covering the center and at least one cover covering the core, wherein the center is formed from a center composition containing (A) at least one component selected from the group consisting of (a-1) a binary copolymer composed of an olefin and an $\alpha,\beta$-unsaturated carboxylic acid having 3 to 8 carbon atoms; (a-2) an ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, and (B) a basic metal salt of a fatty acid, and the envelope layer is formed from a rubber composition.

(B) The basic metal salt of the fatty acid used in the present invention has stronger basicity than a general metal salt of a fatty acid, and thus effectively neutralizes unneutralized carboxyl groups in (A) the resin component. As a result, the degree of neutralization of (A) the resin component increases, and the resilience of the obtained golf ball resin component is improved. In particular, the center composition containing (B) the basic metal salt of the fatty acid has greater effect of improving the resilience than the center composition containing a basic inorganic metal compound and a fatty acid respectively.

According to the present invention, the multi-piece golf ball with an excellent resilience and controllability is obtained.

DESCRIPTION OF THE PREFERRED EMBODIMENT

The present invention provides a multi-piece golf ball comprising a core composed of a center and an envelope layer covering the center and at least one cover covering the core, wherein the center is formed from a center composition containing (A) at least one component selected from the group consisting of (a-1) a binary copolymer composed of an olefin and an α,β-unsaturated carboxylic acid having 3 to 8 carbon atoms; (a-2) an ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, and (B) a basic metal salt of a fatty acid, and the envelope layer is formed from a rubber composition.

(1) Center Composition

First, the center composition containing (A) at least one resin component selected from the group consisting of (a-1) a binary copolymer composed of an olefin and an α,β-unsaturated carboxylic acid having 3 to 8 carbon atoms; (a-2) an ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms, and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester; and (B) the basic metal salt of the fatty acid will be explained.

(a-1) component is a nonionic binary copolymer composed of an olefin and an α,β-unsaturated carboxylic acid having 3 to 8 carbon atoms wherein the carboxyl groups thereof are not neutralized. Further, (a-2) component includes an ionomer resin prepared by neutralizing at least a part of carboxyl groups in the binary copolymer composed of an olefin and α,β-unsaturated carboxylic acid having 3 to 8 carbon atoms with a metal ion.

(a-3) component is a nonionic ternary copolymer composed of an olefin, an α,β-unsaturated carboxylic acid having 3 to 8 carbon atoms, and an α,β-unsaturated carboxylic acid ester wherein the carboxyl groups thereof are not neutralized. (a-4) component includes an ionomer resin prepared by neutralizing at least a part of carboxyl groups in the ternary copolymer composed of an olefin and α,β-unsaturated carboxylic acid having 3 to 8 carbon atoms, and an α,β-unsaturated carboxylic acid ester with a metal ion.

In the present invention, "(a-1) the binary copolymer composed of an olefin and an α,β-unsaturated carboxylic acid having 3 to 8 carbon atoms" is sometimes merely referred to as "binary copolymer". "(a-2) The ionomer resin consisting of a metal ion-neutralized product of a binary copolymer composed of an olefin and an α,β-unsaturated carboxylic acid having 3 to 8 carbon atoms" is sometimes referred to as "the binary ionomer resin". "(a-3) The ternary copolymer composed of an olefin, an α,β-unsaturated carboxylic acid having 3 to 8 carbon atoms, and an α,β-unsaturated carboxylic acid ester" is sometimes merely referred to as "ternary copolymer". "(a-4) The ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester" is sometimes referred to as "the ternary ionomer resin".

The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable.

(a-1) The binary copolymer preferably includes a binary copolymer composed of ethylene and (meth)acrylic acid. (a-2) The binary ionomer resin preferably includes the metal ion-neutralized product of the binary copolymer composed of ethylene-(meth)acrylic acid. (a-3) The ternary copolymer preferably includes a ternary copolymer composed of ethylene, (meth)acrylic acid, and (meth)acrylic acid ester. (a-4) The ternary ionomer resin preferably includes the metal ion-neutralized product of the ternary copolymer composed of ethylene, (meth)acrylic acid, and (meth)acrylic acid ester. Here, (meth)acrylic acid means acrylic acid and/or methacrylic acid.

The content of the α,β-unsaturated carboxylic acid component having 3 to 8 carbon atoms in (a-1) the binary copolymer or (a-3) the ternary copolymer is preferably 4 mass % or more, more preferably 5 mass % or more, and is preferably 30 mass % or less, more preferably 25 mass % or less.

The melt flow rate (190° C., 2.16 kg) of (a-1) the binary copolymer or (a-3) the ternary copolymer is preferably 5 g/10 min or more, more preferably 10 g/10 min or more, and even more preferably 15 g/10 min or more, and is preferably 1,700 g/10 min or less, more preferably 1,500 g/10 min or less, even more preferably 1,300 g/10 min or less. If the melt flow rate (190° C., 2.16 kg) of (a-1) the binary copolymer or (a-3) the ternary copolymer is 5 g/10 min or more, the center composition has better fluidity, and thus it is easier to mold a constituent member. If the melt flow rate (190° C., 2.16 kg) of (a-1) the binary copolymer or (a-3) the ternary copolymer is 1,700 g/10 min or less, the resultant golf ball has better durability.

Specific examples of (a-1) the binary copolymer include an ethylene-methacrylic acid copolymer such as "NUCREL (registered trademark) (e.g. NUCREL N1050H, NUCREL N2050H, NUCREL N1110H, NUCREL N0200H) manufactured by Du Pont-Mitsui Polychemicals Co, and an ethylene-acrylic acid copolymer such as "PRIMACORE (registered trademark) 5980I" available from Dow Chemical Company.

Specific examples of (a-3) the ternary copolymer include "NUCREL (registered trademark) (e.g. NUCREL AN4318, NUCREL AN4319) manufactured by Du Pont-Mitsui Polychemicals Co, and "NUCREL (registered trademark) (e.g. NUCREL AE) manufactured by E.I. du Pont de Nemours and Company, and "PRIMACORE (registered trademark) (e.g. PRIMCOR AT310, PRIMCOR AT320) available from Dow Chemical Company. (a-1) The binary copolymer or (a-3) the ternary copolymer may be used alone or as a mixture of at least two of them.

The content of the α,β-unsaturated carboxylic acid having 3 to 8 carbon atoms of (a-2) the binary ionomer resin is preferably 15 mass % or more, more preferably 16 mass % or more, and even more preferably 17 mass % or more, and is preferably 30 mass % or less, more preferably 25 mass % or less. If the content of the α,β-unsaturated carboxylic acid having 3 to 8 carbon atoms is 15 mass % or more, the resultant constituent member has a desirable hardness. If the content of the α,β-unsaturated carboxylic acid having 3 to 8 carbon atoms is 30 mass % or less, since the hardness of the resultant constituent member does not become excessively high, the durability and shot feeling become better.

The degree of neutralization of the carboxyl groups contained in (a-2) the binary ionomer resin is preferably 15 mole % or more, more preferably 20 mole % or more, and is preferably 90 mole % or less, more preferably 85 mole % or less. If the degree of neutralization is 15 mole % or more, the resultant golf ball has better resilience and durability. On the other hand, if the degree of neutralization is 90 mole % or less, the center composition has better fluidity (good moldability). The degree of neutralization of the carboxyl groups of (a-2) the binary ionomer resin can be calculated by the following expression.

> Degree of neutralization (mole %) of the binary ionomer resin=(the number of moles of carboxyl groups neutralized in the binary ionomer resin/the number of moles of all carboxyl groups contained in the binary ionomer resin)×100

Examples of a metal ion used for neutralizing at least a part of carboxyl groups of (a-2) the binary ionomer resin include: monovalent metal ions such as sodium, potassium, lithium, or the like; divalent metals ions such as magnesium, calcium, zinc, barium, cadmium, or the like; trivalent metals ions such as aluminum or the like; and other metals ions such as tin, zirconium, or the like.

Specific examples of (a-2) the binary ionomer resin include trade name "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329(Zn))" commercially available from Du Pont-Mitsui Polychemicals Co., Ltd.

Further, examples include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" commercially available from E.I. du Pont de Nemours and Company.

Further, examples include "Iotek (registered trademark) (e.g. Iotek 8000 (Na), Iotek 8030 (Na), Iotek 7010 (Zn), Iotek 7030 (Zn))" commercially available from ExxonMobil Chemical Corporation.

(a-2) The binary ionomer resins may be used alone or as a mixture of at least two of them. It is noted that Na, Zn, Li, and Mg described in the parentheses after the trade names indicate metal types of neutralizing metal ions of the binary ionomer resins.

(a-2) The binary ionomer resin preferably has a bending stiffness of 140 MPa or more, more preferably 150 MPa or more, and even more preferably 160 MPa or more, and preferably has a bending stiffness of 550 MPa or less, more preferably 500 MPa or less, even more preferably 450 MPa or less. If the bending stiffness of (a-2) the binary ionomer resin is too low, the flight distance tends to be shorter because of the increased spin rate of the golf ball. If the bending stiffness is too high, the durability of the golf ball may be lowered.

(a-2) The binary ionomer resin preferably has the melt flow rate (190° C., 2.16 kg) of 0.1 g/10 min or more, more preferably 0.5 g/10 min or more, and even more preferably 1.0 g/10 min or more, and preferably has the melt flow rate (190° C., 2.16 kg) of 30 g/10 min or less, more preferably 20 g/10 min or less, and even more preferably 15 g/10 min or less. If the melt flow rate of (a-2) the binary ionomer resin is 0.1 g/10 min or more, the center composition has better fluidity and thus it is easy to mold the constituent member. If the melt flow rate of (a-2) the binary ionomer resin is 30 g/10 min or less, the durability of the resultant golf ball becomes better.

(a-2) The binary ionomer resin preferably has a slab hardness of 50 or more, more preferably 55 or more, even more preferably 60 or more, and preferably has a slab hardness of 75 or less, more preferably 73 or less, even more preferably 70 or less in Shore D hardness. If the binary ionomer resin has a slab hardness of 50 or more in Shore D hardness, the resultant constituent member has a high hardness. If the binary ionomer resin has a slab hardness of 75 or less in Shore D hardness, the resultant constituent member does not become excessively hard and thus the obtained golf ball has better durability.

The content of the α,β-unsaturated carboxylic acid having 3 to 8 carbon atoms in (a-4) the ternary ionomer resin is preferably 2 mass % or more, more preferably 3 mass % or more, and is preferably 30 mass % or less, more preferably 25 mass % or less.

The degree of neutralization of the carboxyl groups contained in (a-4) the ternary ionomer resin is preferably 20 mole % or more, more preferably 30 mole % or more, and is preferably 90 mole % or less, more preferably 85 mole % or less. If the degree of neutralization is 20 mole % or more, the resultant golf ball obtained by using the center composition of the present invention has better resilience and durability. If the degree of neutralization is 90 mole % or less, the center composition has better fluidity (good moldability). The degree of neutralization of the carboxyl groups in the ionomer resin can be calculated by the following expression.

> Degree of neutralization (mole %) of the ionomer resin=(the number of moles of carboxyl groups neutralized in the ionomer resin/the number of moles of all carboxyl groups contained in the ionomer resin)×100

Examples of a metal ion used for neutralizing at least a part of carboxyl groups of (a-4) the ternary ionomer resin include: monovalent metal ions such as sodium, potassium, lithium, or the like; divalent metals ions such as magnesium, calcium, zinc, barium, cadmium, or the like; trivalent metals ions such as aluminum or the like; and other metals ions such as tin, zirconium, or the like.

Specific examples of (a-4) the ternary ionomer resin include trade name "Himilan (registered trademark) (e.g. Himilan AM7327 (Zn), Himilan 1855 (Zn), Himilan 1856 (Na), Himilan AM7331 (Na), or the like)" commercially available from Du Pont-Mitsui Polychemicals Co., Ltd. Further, the ternary ionomer resins commercially available from E.I. du Pont de Nemours and Company include trade name "Surlyn (registered trademark) (e.g. Surlyn 6320 (Mg), Surlyn 8120 (Na), Surlyn 8320 (Na), Surlyn 9320 (Zn), Surlyn 9320W (Zn), HPF1000 (Mg), HPF2000 (Mg) or the like)". The ionomer resins commercially available from ExxonMobil Chemical Corporation include trade name "Iotek (registered trademark) (e.g. Iotek 7510 (Zn), Iotek 7520 (Zn) or the like)". It is noted that Na, Zn and Mg described in the parentheses after the trade names indicate metal types of neutralizing metal ions. (a-4) The ternary ionomer resins may be used alone or as a mixture of at least two of them.

(a-4) The ternary ionomer resin preferably has a bending stiffness of 10 MPa or more, more preferably 11 MPa or more, even more preferably 12 MPa or more, and preferably has a bending stiffness of 100 MPa or less, more preferably 97 MPa or less, even more preferably 95 MPa or less. If the bending stiffness of (a-4) the ternary ionomer resin is too low, the flight distance tends to be shorter because of the increased spin rate of the golf ball. If the bending stiffness is too high, the durability of the golf ball may be lowered.

(a-4) The ternary ionomer resin preferably has the melt flow rate (190° C., 2.16 kg) of 0.1 g/10 min or more, more preferably 0.3 g/10 min or more, and even more preferably 0.5 g/10 min or more, and preferably has the melt flow rate (190° C., 2.16 kg) of 20 g/10 min or less, more preferably 15 g/10 min or less, even more preferably 10 g/10 min or less. If the melt flow rate (190° C., 2.16 kg) of (a-4) the ternary ionomer resin is 0.1 g/10 min or more, the center composition has better fluidity and thus the molding becomes easy. If the melt flow rate (190° C., 2.16 kg) of (a-4) the ternary ionomer resin is 20 g/10 min or less, the durability of the resultant golf ball becomes better.

(a-4) The ternary ionomer resin preferably has a slab hardness of 20 or more, more preferably 25 or more, even more preferably 30 or more, and preferably has a slab hardness of 70 or less, more preferably 65 or less, even more preferably 60 or less in Shore D hardness. If the ternary ionomer resin has a slab hardness of 20 or more in Shore D hardness, the resultant constituent member does not become excessively soft and thus the golf ball has higher resilience. If the ternary ionomer resin has a slab hardness of 70 or less in Shore D hardness, the resultant constituent member does not become excessively hard and thus the golf ball has better durability.

As (A) the resin component, (a-1) the binary copolymer, (a-2) the binary ionomer resin, (a-3) the ternary copolymer, and (a-4) the ternary ionomer resin may be used alone or as a mixture of at least two of them. The center composition of the present invention preferably includes (a-3) the ternary copolymer or (a-4) the ternary ionomer resin as (A) the resin component, because the resultant constituent member does not become excessively hard, and thus the golf ball has higher resilience.

Next, (B) the basic metal salt of the fatty acid is described. (B) The basic metal salt of the fatty acid is obtained by a well-known producing method where a fatty acid is allowed to react with a metal oxide or metal hydroxide. A general metal salt of a fatty acid is obtained by a reaction of a fatty acid with a metal oxide or metal hydroxide in an amount of the reaction equivalent, whereas a basic metal salt of a fatty acid is obtained by adding a metal oxide or metal hydroxide in an excessive amount which is larger than the reaction equivalent to a fatty acid. The metal content, melting point or the like of the product are different from those of a general metal salt of a fatty acid.

As (B) the basic metal salt of the fatty acid, preferred is a basic metal salt of a fatty acid represented by the following general formula (1).

$$mM^1O \cdot M^2(RCOO)_2 \quad (1)$$

In formula (1), m represents the number of moles of metal oxides or metal hydroxides in the basic metal salt of the fatty acid. m preferably ranges from 0.1 to 2.0, and more preferably from 0.2 to 1.5. If m is less than 0.1, the resilience of the obtained resin composition may be lowered, while if m exceeds 2.0, the melting point of the basic metal salt of the fatty acid becomes too high and thus it may be difficult to disperse to the resin component. As $M^1$ and $M^2$, the group II or the group XII metals of the periodic table are preferred, respectively. $M^1$ and $M^2$ may be identical or different each other. Examples of the group II metals include beryllium, magnesium, calcium, strontium and barium. Examples of the group XII metals include zinc, cadmium and mercury. Preferred is, for example, magnesium, calcium, barium or zinc, and more preferred is magnesium, as $M^1$ and $M^2$ metals.

In formula (1), RCOO means the residue of the saturated fatty acid or unsaturated fatty acid. Specific examples of the saturated fatty acid component of (B) the basic metal salt of the fatty acid (IUPAC name) include butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecanoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), and triacontanoic acid (C30).

Specific examples of the unsaturated fatty acid component of (B) the basic metal salt of the fatty acid (IUPAC name) include butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), and triacontenoic acid (C30).

Specific examples of the fatty acid component of (B) the basic metal salt of the fatty acid (Common name) are, for example, butyric acid (C4), valeric acid (C5), caproic acid (C6), enanthic acid (C7), caprylic acid (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linoleic acid (C18), linolenic acid (C18), 12-hydroxy stearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30).

(B) The basic metal salt of the fatty acid is preferably a basic metal salt of an unsaturated fatty acid. The unsaturated fatty acid component preferably includes at least one selected from the group consisting of oleic acid (C18), erucic acid (C22), linoleic acid (C18), linolenic acid (C18), arachidonic acid (C20), eicosapentaenoic acid (C20), docosahexaenoic acid (C22), stearidonic acid (C18), nervonic acid (C24), vaccenic acid (C18), gadoleic acid (C20), elaidic acid (C18), eicosenoic acid (C20), eicosadienoic acid (C20), docosadienoic acid (C22), pinolenic acid (C18), eleostearic acid (C18), mead acid (C20), adrenic acid (C22), clupanodonic acid (C22), nishinic acid (C24), and tetracosapentaenoic acid (C24).

(B) The basic metal salt of the fatty acid is preferably a basic metal salt of a fatty acid having 8 to 30 carbon atoms, and more preferably a basic metal salt of a fatty acid having 12 to 24 carbon atoms. Specific examples of (B) the basic metal salt of the fatty acid include basic magnesium laurate, basic calcium laurate, basic zinc laurate, basic magnesium myristate, basic calcium myristate, basic zinc myristate, basic magnesium palmitate, basic calcium palmitate, basic zinc palmitate, basic magnesium oleate, basic calcium oleate, basic zinc oleate, basic magnesium stearate, basic calcium stearate, basic zinc stearate, basic magnesium 12-hydroxystearate, basic calcium 12-hydroxystearate, basic zinc 12-hydroxystearate, basic magnesium behenate, basic calcium behenate, and basic zinc behenate. (B) The basic metal salt of the fatty acid preferably includes basic magnesium fatty acid, and more preferably basic magnesium stearate, basic magnesium behenate, basic magnesium laurate, and basic magnesium oleate. (B) The basic metal salt of the fatty acid may be used alone or as a mixture of at least two of them.

There is no particular limitation on the melting point of (B) the basic metal salt of the fatty acid, but if the metal is magnesium, the melting point is preferably 100° C. or more, and is preferably 300° C. or less, more preferably 290° C. or less, even more preferably 280° C. or less. If the melting point falls within the above range, the dispersibility to the resin component becomes better.

(B) The basic metal salt of the fatty acid preferably contains the metal component in an amount of 1 mole % or more, more preferably 1.1 more % or more, and preferably contains the metal component in an amount of 2 mole % or less, more preferably 1.9 mole % or less. If the content of the metal component falls within the above range, the resilience of the obtained golf ball further improves. The content of the metal component of (B) the basic metal salt of the fatty acid is the numerical value calculated by dividing the metal amount (g) contained per 1 mole of the metal salt by the atomic weight of the metal, and is expressed in mole %.

The center composition used in the present invention preferably contains (B) the basic metal salt of the fatty acid in an amount of 25 parts by mass or more, more preferably 33 parts by mass or more, even more preferably 50 parts by mass or more, and preferably contains (B) the basic metal salt of the fatty acid in an amount of 100 parts by mass or less, with respect to 100 parts by mass of (A) the resin component. If the content of (B) the basic metal salt of the fatty acid is 25 parts by mass or more, the resilience of the golf ball improves, while if the content is 100 parts by mass or less, it is possible to suppress the lowering of the durability of the golf ball due to the increase in the low-molecular weight component.

The center composition used in the present invention preferably contains only (A) the resin component as the resin component; however, the center composition may contain a thermoplastic elastomer or a thermoplastic resin, as long as they do not impair the effect of the present invention. If the center composition contains a thermoplastic elastomer or a thermoplastic resin, the content of (A) the resin component in the resin component is preferably 50 mass % or more, more preferably 60 mass % or more, and even more preferably 70 mass % or more.

Examples of other thermoplastic elastomers are a thermoplastic polyamide elastomer having a commercial name of "Pebax (e.g. "Pebax 2533")" commercially available from Arkema K. K.; a thermoplastic polyurethane elastomer having a commercial name of "Elastollan (e.g. "Elastollan XNY85A")" commercially available from BASF Japan Ltd; a thermoplastic polyester elastomer having a commercial name of "Hytrel (e.g. "Hytrel 3548", "Hytrel 4047")" commercially available from Du Pont-Toray Co., Ltd.; a thermoplastic styrene elastomer having a commercial name of "Rabalon (e.g. "Rabalon T3221C")" commercially available from Mitsubishi Chemical Corporation; and the like.

The center composition used in the present invention may further contain a pigment component such as a white pigment (for example, titanium oxide) and a blue pigment, a weight adjusting agent, a dispersant, an antioxidant, an ultraviolet absorber, a light stabilizer, a fluorescent material, a fluorescent brightener, and the like, as long as they do not impair the effect of the present invention.

The content of the white pigment (for example, titanium oxide) is preferably 0.5 part or more, more preferably 1 part or more, and the content of the white pigment is preferably 10 parts or less, more preferably 8 parts or less, with respect to 100 parts of the resin component by mass. If the amount of the white pigment is 0.5 part by mass or more, it is possible to impart the opacity to the resultant golf ball constituent member. Further, if the amount of the white pigment is more than 10 parts by mass, the durability of the resultant golf ball may deteriorate.

The center composition used in the present invention can be obtained, for example, by dry blending (A) component and (B) component. Further, the dry blended mixture may be extruded into the form of pellet. The dry blending may be carried out using for example, a mixer capable of blending raw materials in the form of pellet, more preferably a tumbler type mixer. Extruding can be carried out by publicly known extruders such as a single-screw kneading extruder, a twin-screw kneading extruder, and a twin-single kneading extruder.

The center composition used in the present invention preferably has a hardness of 20 or larger, more preferably 25 or larger, and even more preferably 30 or larger in shore D hardness, and the center composition preferably has a hardness of 80 or smaller, more preferably 77 or smaller, and even preferably 75 or smaller in shore D hardness. Use of the center composition having a hardness of 20 or larger in shore D hardness provides the golf ball excellent in the resilience (flying distance). On the other hand, use of the center composition having a hardness of 80 or smaller in shore D hardness provides the golf ball excellent in the shot feeling. Here, a hardness of the center composition is a slab hardness of the center composition that is molded into a sheet form. The method for the measurement is described later.

The center composition of the present invention preferably has the melt flow rate (190° C., 2.16 kg) of 0.01 g/10 min or more, more preferably 0.05 g/10 min or more, and even more preferably 0.1 g/10 min or more, and preferably has the melt flow rate (190° C., 2.16 kg) of 100 g/10 min or less, more preferably 80 g/10 min or less, and even more preferably 50 g/10 min or less. If the center composition has the melt flow rate in the above range, the moldability into the golf ball constituent member is good.

The center composition preferably has a bending stiffness of 10 MPa or more, more preferably 15 MPa or more, even more preferably 20 MPa or more, and preferably has a bending stiffness of 450 MPa or less, more preferably 400 MPa or less, even more preferably 350 MPa or less. Use of the center composition having a bending stiffness of 10 MPa or more provides the golf ball excellent in the resilience (flying distance). On the other hand, if the bending stiffness is 450 MPa or less, the obtained golf ball becomes appropriately soft and thus the shot feeling becomes good.

The center composition preferably has a rebound resilience of 40% or more, more preferably 43% or more, even more preferably 46% or more. Use of the center composition having a rebound resilience of 40% or more provides the golf ball excellent in the resilience (flying distance). Here, the bending stiffness and the rebound resilience of the center composition are measured by molding the center composition into a sheet form. The methods for the measurement are described later.

(2) Envelope Layer Composition

For the envelope layer of the multi-piece golf ball of the present invention, a conventionally known rubber composition may be employed. The envelope layer is molded by, for example, heat-pressing an envelope layer rubber composition (hereinafter simply referred to as "envelope layer composition" occasionally) containing a base rubber, a crosslinking initiator, a co-crosslinking agent, and a filler.

As the base rubber, a natural rubber and/or a synthetic rubber may be used. Examples of the base rubber are a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4-bond in a proportion of 40% or more, more preferably 70% or more, even more preferably 90% or more in view of its superior resilience property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended is preferably 0.3 part by mass or more, more preferably 0.4 part by mass or more, and is preferably 5 parts by mass or less, more preferably 3 parts by mass or less based on 100 parts by mass of the base rubber. If the amount is less than 0.3 part by mass, the envelope layer becomes too soft, and the resilience tends to be lowered, and if the amount is more than 5 parts by mass, the amount of the co-crosslinking agent must be increased in order to obtain the appropriate hardness, which tends to cause the insufficient resilience.

The co-crosslinking agent is considered to have an action of crosslinking a rubber molecule by graft polymerization to a base rubber molecular chain. As the co-crosslinking agent, preferred is, for example, an α,β-unsaturated carboxylic acid having 3 to 8 carbon atoms or a metal salt thereof, more preferably acrylic acid, methacrylic acid or a metal salt thereof. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 15 parts or more, even more preferably 20 parts or more, and is preferably 55 parts or less, more preferably 50 parts or less, even more preferably 48 parts or less, based on 100 parts of the base rubber by mass. If the amount of the co-crosslinking agent to be used is less than 10 parts by mass, the amount of the crosslinking initiator must be increased to obtain an appropriate hardness, which tends to lower the resilience. On the other hand, if the amount of the co-crosslinking agent to be used is more than 55 parts by mass, the envelope layer becomes too hard, so that the shot feeling may be lowered.

The filler contained in the envelope layer composition is mainly blended as a weight adjusting agent in order to adjust the weight of the golf ball obtained as the final product, and may be blended as required. Examples of the filler include inorganic fillers such as zinc oxide, barium sulfate, calcium carbonate, magnesium oxide, tungsten powder, and molybdenum powder. The amount of the filler to be blended is preferably 0.5 part or more, more preferably 1 part or more, and is preferably 30 parts or less, more preferably 20 parts or less based on 100 parts of the base rubber by mass. If the amount of the filler to be blended is less than 0.5 part by mass, it becomes difficult to adjust the weight, while if it is more than 30 parts by mass, the weight ratio of the rubber component becomes small and the resilience tends to be lowered.

To the envelope layer rubber composition, an organic sulfur compound, an antioxidant or a peptizing agent may be blended appropriately in addition to the base rubber, the crosslinking initiator, the co-crosslinking agent and the filler.

Examples of the organic sulfur compound include thiophenols, thionaphthols, polysulfides, thiocarboxylic acids, dithiocarboxylic acids, sulfenamides, thiurams, dithiocarbamates, thiazoles, and the like. Among them, diphenyl disulfide or derivative thereof is preferably used as the organic sulfur compound. Examples of the diphenyl disulfide or the derivative thereof include diphenyl disulfide; mono-substituted diphenyldisulfides such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; di-substituted diphenyldisulfides such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; tri-substituted diphenyldisulfides such as bis(2,4,6-trichlorophenyl)disulfide, and bis(2-cyano-4-chloro-6-bromophenyl)disulfide; tetra-substituted diphenyldisulfides such as bis(2,3,5,6-tetra chlorophenyl)disulfide; penta-substituted diphenyldisulfides such as bis(2,3,4,5,6-pentachlorophenyl)disulfide and bis(2,3,4,5,6-pentabromophenyl)disulfide. These diphenyldisulfides or the derivative thereof can enhance resilience by having some influence on the state of vulcanization of vulcanized rubber. Among them, diphenyldisulfide or bis(pentabromophenyl)disulfide is preferably used since the golf ball having particularly high resilience can be obtained. The blending amount of the organic sulfur compound is preferably 0.1 part by mass or more, more preferably 0.3 part by mass or more, and is preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

(3) Cover Composition

The cover of the golf ball of the present invention is formed from a cover composition containing a resin component. The resin component includes, for example, an ionomer resin; a thermoplastic polyurethane elastomer having a commercial name of "Elastollan (registered trademark) (e.g. "Elastollan XNY97A")" commercially available from BASF Japan Ltd.; a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic styrene elastomer having a commercial name of "Rabalon (registered trademark) (e.g. "Rabalon T3221C")" commercially available from Mitsubishi Chemical Corporation. As an ionomer resin, (a-2) the binary ionomer resin and/or (a-4) the ternary ionomer resin exemplified as the center composition can be also used. Further, (a-1) the binary copolymer and/or (a-3) the ternary copolymer used for the center composition can be also used. These resin components are used solely or as a mixture of at least two of them.

In one preferable embodiment, the cover composition preferably contains the polyurethane elastomer or the ionomer resin as the resin component. The content of the polyurethane elastomer or the ionomer resin in the resin component of the cover composition is preferably 50 mass % or more, more preferably 60 mass % or more, even more preferably 70 mass % or more.

The multi-piece golf ball of the present invention preferably includes an inner cover layer and an outer cover layer as a cover. The inner cover layer is preferably formed from an inner cover layer composition containing an ionomer resin as a resin component. The outer cover layer is preferably formed from an outer cover layer composition containing a thermoplastic polyurethane elastomer as a resin component.

In the present invention, in addition to the aforementioned resin component, the cover composition may further contain a pigment component such as a white pigment (for example, titanium oxide), a blue pigment, a red pigment, or the like; a weight adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the cover.

The amount of the white pigment (for example, titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. If the amount of the white pigment is 0.5 parts by mass or more, it is possible to impart the opacity to the cover. If the amount of the white pigment is more than 10 parts by mass, the durability of the resultant cover may deteriorate.

(4) Adhesive Layer Composition

The multi-piece golf ball of the present invention may have an adhesive layer between the constituting members. For example, the adhesive layer is preferably formed between the inner cover layer and the outer cover layer. The adhesive layer is formed from an adhesive layer composition containing a resin component. As the resin component, a two-component curing type thermosetting resin is suitably used. Specific examples thereof include epoxy resins, urethane resins, acryl resins, polyester based resins and cellulose based resins. Among them, a two-component curing type epoxy resin is preferred as the resin component. Particularly, the adhesive layer is preferably formed from a two-component curing type adhesive layer composition containing a bisphenol A type epoxy resin as a base resin and a polyamine compound as a curing agent.

The adhesive layer composition, for example, is obtained by blending a base agent containing a bisphenol A type epoxy resin and a solvent and a curing agent containing a polyamine compound and a solvent. Examples of the solvent in the base agent and curing agent include organic solvents such as xylene and toluene as well as water.

Specific examples of the polyamine compound include polyamideamine or modified products thereof. Polyamideamine has multiple amino groups and one or more amide groups. This amino group can react with an epoxy group. Polyamideamine is obtained by a condensation reaction between a polymerized fatty acid and a polyamine. Typical polymerized fatty acids are synthesized by heating natural fatty acids containing a large amount of an unsaturated fatty acid such as linoleic acid, linolenic acid or the like in the presence of a catalyst. Specific examples of the unsaturated fatty acid include tall oil, soybean oil, linseed oil and fish oil. Polymerized fatty acids having a dimer content of 90 mass % or more and a trimer content of 10 mass % or less, and being hydrogenated are preferred. Illustrative examples of preferred polyamine include polyethylene diamine, polyoxyalkylene diamine and derivatives thereof.

The adhesive layer composition preferably has a gel fraction of 40 mass % or more. The adhesive layer formed from the adhesive layer composition having the gel fraction of 40 mass % or more contains little bubble since the volatile component hardly remains in the adhesive layer. The adhesive layer composition firmly adheres to the constituents members such as the inner cover layer and the outer cover layer. From this aspect, the gel fraction is preferably 45 mass % or more, more preferably 50 mass % or more.

The gel fraction of the adhesive layer composition is preferably 80 mass % or less. The adhesive layer composition having the gel fraction of 80 mass % or less sufficiently reacts with a base polymer of the inner cover layer as well as with a base polymer of the outer cover layer. This adhesive layer composition firmly adheres to the constituent members such as the inner cover layer and the outer cover layer. From this aspect, the gel fraction is preferably 76 mass % or less, more preferably 70 mass % or less.

The adhesive layer formed from the adhesive layer composition having the gel fraction of 40 mass % or more and 80 mass % or less particularly exerts its effect in the golf ball with a thin cover. The adhesive layer formed from the adhesive layer composition having the gel fraction of 40 mass % or more and 80 mass % or less particularly exerts its effect in the golf ball with a soft cover.

Upon measurement of the gel fraction, the adhesive layer composition is coated on a PB-137T zinc phosphate-treated steel plate immediately after the base resin and curing agent is blended. The size of the steel plate is "150 mm×70 mm". The steel plate has a thickness of 0.8 mm. This steel plate is kept under an environment of 40° C. for 24 hours to form a paint film composed of the adhesive layer composition. Test pieces are obtained from the steel plate and the paint film. The mass of the test pieces is measured, and the mass M1 of the paint film is calculated by reducing the mass of the steel plate from the mass of the test pieces. The test pieces are dipped into acetone and left for 24 hours. This test pieces are kept under an environment of 105° C. for 1 hour and then cooled to 23° C. The mass of the test pieces is measured, and the mass M2 of the paint film is calculated by reducing the mass of the steel plate from the measured mass of the test pieces. The gel fraction G is calculated based on the following expression.

$G=(M2/M1)\times100$

In this adhesive layer composition, a ratio of epoxy equivalent of the bisphenol A type epoxy resin and amine active hydrogen equivalent of the curing agent is preferably 2.0/1.0 or more and 13.0/1.0 or less. If the adhesive layer composition having the ratio of 2.0/1.0 or more, the gel fraction does not become too small. Accordingly, the adhesive layer firmly adheres to the constituent members such as the inner cover layer and the outer cover layer. From this aspect, the ratio is preferably 2.6/1.0 or more, more preferably 4.0/1.0 or more. If the adhesive layer composition has the ratio of 13.0/1.0 or less, the gel fraction does not become too large so that the adhesive layer firmly adheres to the constituent members such as the inner cover layer and the outer cover layer. From this aspect, the ratio is preferably 12.2/1.0 or less, more preferably 10.0/1.0 or less.

The amine active hydrogen equivalent of the curing agent is preferably 100 g/eq or more and 800 g/eq or less. If the adhesive layer composition contains the curing agent with the amine active hydrogen equivalent of 100 g/eq or more, the gel fraction does not become too large so that the adhesive layer firmly adheres to the constituent members such as the inner cover layer and the outer cover layer. From this aspect, the equivalent is preferably 200 g/eq or more, and more preferably 300 g/eq or more. If the adhesive layer composition contains the curing agent with the amine active hydrogen equivalent of 800 g/eq or less, the gel fraction does not become too small. Accordingly, the adhesive layer firmly adheres to the constituent members such as the inner cover layer and the outer cover layer. From this aspect, the equivalent is preferably 600 g/eq or less, and more preferably 500 g/eq or less.

The adhesive layer composition contains water as volatile content. The term of volatile content means both water and an organic solvent. The proportion Pw of the water weight relative to the total weight of the volatile content is preferably 90 mass % or more. The adhesive layer composition having the proportion Pw of 90 mass % or more facilitates the control of the gel fraction. In this light, the proportion Pw is preferably 95 mass % or more, more preferably 99 mass % or more. The proportion Pw may be 100%. In light of environment, the proportion Po of the weight of the organic solvent relative to the total volume of the volatile content is preferably 10 mass % or less, more preferably 5 mass % or less, even more preferably 1 mass % or less.

The adhesive layer composition may contain additives such as a coloring agent (typically, titanium dioxide), an antioxidant, a light stabilizer, a fluorescent brightening agent, an ultraviolet absorbent, an anti-blocking agent or the like. The additives may be added either to the base resin or to the curing agent.

(5) Golf Ball Construction

The multi-piece golf ball of the present invention includes a core composed of a center and an envelope layer covering the center and at least one cover covering the core. Specific examples of the multi-piece golf ball of the present invention include a three-piece golf ball comprising a core composed of a center and an envelope layer covering the center and a single-layered cover covering the core, a four-piece golf ball comprising a core composed of a center and an envelope layer covering the center and two covers covering the core, and the like.

(5-1) Center

The center of the golf ball of the present invention preferably has a diameter of 5 mm or more, more preferably 7 mm or more, and even more preferably 10 mm or more. If the center has a diameter of 5 mm or more, the resilience of the golf ball enhances. Further, for forming the envelope layer having a sufficient thickness, the center has a diameter of 30 mm or less, more preferably 29 mm or less, and even more preferably 28 mm or less.

The center preferably has a center hardness of 30 or more, more preferably 31 or more, and even more preferably 32 or more in Shore D hardness. If the center hardness of the center is less than 30 in Shore D hardness, the center becomes too soft and the resilience may be lowered. The center preferably has a center hardness of 50 or less, more preferably 48 or less, and even more preferably 45 or less in Shore D hardness. If the center hardness of the center exceeds 50 in Shore D hardness, the center becomes too hard and the shot feeling tends to deteriorate. In the present invention, the center hardness of the center is the hardness measured with the Shore D type spring hardness tester at the central point of a cut plane of a center which has been cut into two halves.

The center preferably has a surface hardness of 30 or more, more preferably 31 or more, even more preferably 32 or more, and preferably has a surface hardness of 50 or less, more preferably 48 or less, even more preferably 45 or less in Shore D hardness. If the center has a surface hardness of 30 or more in Shore D hardness, the center does not become too soft, and resilience tends to be better. If the center has a surface hardness of 50 or less in Shore D hardness, the center does not become too hard, and the better shot feeling is obtained.

(5-2) Envelope Layer

The golf ball of the present invention includes the envelope layer covering the center. The center and the envelope layer covering the center constitute the core. The envelope layer preferably has a thickness of 0.5 mm or more, more preferably 0.6 mm or more, and even more preferably 0.7 mm or more. If the thickness of the envelope layer is 0.5 mm or more, it is easier to mold the envelope layer, and the durability of the obtained golf ball is enhanced. The envelope layer preferably has a thickness of 20 mm or less, more preferably 19 mm or less, and even more preferably 18 mm or less. If the thickness of the envelope layer is 20 mm or less, the resilience and shot feeling of the obtained golf ball become better.

The envelope layer preferably has a slab hardness of 40 or more, more preferably 41 or more, even more preferably 42 or more, and preferably has a slab hardness of 70 or less, more preferably 69 or less, even more preferably 68 or less in Shore D hardness. If the slab hardness of the envelope layer is 40 or more in Shore D hardness, the better resilience is obtained. If the slab hardness of the envelope layer is 70 or less in Shore D hardness, the core does not become too hard, and the better shot feeling is obtained.

(5-3) Core

The core composed of the center and the envelope layer covering the center preferably has a surface hardness of 40 or more, more preferably 41 or more, even more preferably 42 or more, and preferably has a surface hardness of 70 or less, more preferably 69 or less, even more preferably 68 or less in Shore D hardness. If the surface hardness of the core is 40 or more in Shore D hardness, the core does not become too soft, and the better resilience is obtained. Further, if the surface hardness of the core is 70 or less in Shore D hardness, the core does not become excessively hard, and the better shot feeling is obtained.

The core preferably has a hardness difference between the surface hardness and the center hardness of 0 or more, more preferably 5 or more, even more preferably 10 or more, and preferably has a hardness difference of 50 or less, more preferably 45 or less, even more preferably 40 or less in Shore D hardness. If the hardness difference between the surface hardness and the center hardness of the core is 0 or more in Shore D hardness, the spin is suppressed, and thus the flight distance of the golf ball becomes greater. If the hardness difference between the surface hardness and the center hardness of the core is 50 or less in Shore D hardness, the durability of a resultant golf ball becomes better.

(5-4) Cover

The golf ball of the present invention includes at least one cover covering the core. The cover may be a single-layered cover or a multi-layered cover with two or more layers. The golf ball of the present invention preferably comprises the inner cover layer and the outer cover layer as the cover.

The inner cover layer preferably has a thickness of 0.5 mm or more, more preferably 0.6 mm or more, and even more preferably 0.7 mm or more. If the thickness of the inner cover layer is 0.5 mm or more, it is easier to mold the inner cover layer, and the durability of the obtained golf ball improves. The inner cover layer preferably has a thickness of 3 mm or less, more preferably 2.9 mm or less, and even more preferably 2.8 mm or less. If the thickness of the inner cover layer is 3 mm or less, the resilience and the durability of the obtained golf ball become better.

The inner cover layer preferably has a slab hardness of 50 or more, more preferably 55 or more, even more preferably 60 or more, and preferably has a slab hardness of 80 or less, more preferably 77 or less, even more preferably 75 or less in Shore D hardness. If the slab hardness of the inner cover layer is 50 or more, the inner cover layer does not become too soft, and the better resilience is obtained. If the slab hardness of the inner cover layer is 80 or less, the inner cover layer does not become too hard, and the better shot feeling is obtained.

The outer cover layer preferably has a thickness of 2.0 mm or less, more preferably 1.6 mm or less, even more preferably 1.2 mm or less, and particularly preferably 1.0 mm or less. If the thickness of the outer cover layer is 2.0 mm or less, the resilience and shot feeling of the obtained golf ball become better. The outer cover layer preferably has a thickness of 0.1 mm or more, more preferably 0.2 mm or more, and even more preferably 0.3 mm or more. If the thickness of the outer cover is less than 0.1 mm, it may be difficult to mold the outer cover layer. Further, the durability and abrasion resistance of the outer cover layer may deteriorate.

The outer cover layer preferably has a hardness of 70 or less, more preferably 68 or less, and even more preferably 65 or less in Shore D hardness. If the hardness of the outer cover layer is 70 or less in Shore D hardness, the spin rate on approach shots with short irons increases. As a result, the golf ball having a good controllability on approach shots is obtained. In order to ensure the spin rate sufficiently for approach shots, the cover preferably has a hardness of 20 or more, more preferably 25 or more, even more preferably 30 or more in Shore D hardness. The hardness of the outer cover layer is the slab hardness measured by molding the outer cover layer composition into a sheet form.

(5-5) Adhesive Layer and Other Construction

The golf ball of the present invention may have an adhesive layer between the inner cover layer and the outer cover layer. The adhesive layer makes the inner cover layer and the outer cover layer adhere firmly. The adhesive layer suppresses delamination of the outer cover layer from the inner cover layer. The golf ball of the present invention preferably comprises a thin outer cover. When the golf ball with a thin outer cover is hit with an edge of a clubface, a wrinkle easily generates. The adhesive layer suppresses the generation of the wrinkle.

The adhesive layer preferably has a thickness of 0.001 mm or greater, and more preferably 0.002 mm or greater. If the thickness of the adhesive layer is 0.001 mm or more, the durability of the golf ball improves. The adhesive layer preferably has a thickness of 0.1 mm or less, and more preferably 0.05 mm or less. The thickness of the adhesive layer is measured by observing a cross section of the golf ball with a microscope. When the inner cover layer has concavities and convexities on its surface by surface roughening, the thickness of the adhesive layer is measured at the top of the convex part. The measurement underneath dimples should be avoided.

The golf ball of the present invention has a diameter ranging from 40 mm to 45 mm. In light of satisfying a regulation of US Golf Association (USGA), the diameter is preferably 42.67 mm or more. In light of prevention of the air resistance, the diameter is preferably 44 mm or less, and more preferably 42.80 mm or less.

The total number of the dimples formed on the surface of the golf ball of the present invention is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

(6) Process for Producing Golf Ball

The center of the golf ball of the present invention can be molded by injection molding the center composition. Specifically, it is preferred that the center composition heated and melted at the temperature of 160° C. to 260° C. is charged into a mold held under the pressure of 1 MPa to 100 MPa for 1 second to 100 seconds. After cooling for 30 to 300 seconds, the mold is opened.

For forming the envelope layer and cover, publicly known methods such as injection molding, compression molding and the like can be employed. In light of productivity, injection molding is preferred.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the case of directly injection molding the cover composition, the cover composition extruded in the pellet form beforehand may be used for injection molding or the materials such as the resin components and the pigment may be dry blended, followed by directly injection molding the blend material. It is preferred to use upper and lower molds having a spherical cavity and pimples for forming a cover, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 200° C. to 250° C. is charged into a mold held under the pressure of 9 MPa to 15 MPa for 0.5 to 5 second. After cooling for 10 to 60 seconds, the mold is opened and the golf ball with the cover molded is taken out from the mold. When molding a cover, the concave portions called "dimple" are usually formed on the surface.

The molding temperature means the highest temperature where the temperature at the surface of the concave portion of the lower mold reaches from closing through opening the molds. Further, the flow beginning temperature of the cover composition can be measured in a pellet form with the following conditions by using a flow characteristics evaluation apparatus (Flow Tester CFT-500, manufactured by Shimadzu Corporation).

Measuring conditions: Area size of a plunger: 1 cm$^2$, Die length: 1 mm, Die diameter: 1 mm, Load: 588.399 N, Start temperature: 30° C., and Temperature increase rate: 3° C./min.

The adhesive layer is obtained by applying, to the surface of the inner cover layer, liquids where the base material and the curing agent are dissolved or dispersed in a solvent. In light of workability, application with a spray gun is preferred. After the application, the solvent is volatilized to permit a reaction of the base material with the curing agent, thereby forming the adhesive layer.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 50 μm or smaller, more preferably 40 μm or smaller, and even more preferably 30 μm or smaller. If the thickness is smaller than 5 μm, the paint film is easy to wear off due to continued use of the golf ball, and if the thickness is larger than 50 μm, the effect of the dimples is reduced, resulting in deteriorating flying performance of the golf ball.

EXAMPLES

Hereinafter, the present invention will be described in detail by way of example. The present invention is not limited to examples described below. Various changes and modifications can be made without departing from the spirit and scope of the present invention.

[Evaluation Methods]
(1) Hardness of Center and Core (Shore D Hardness)

A type P1 auto loading durometer manufactured by Kobunshi Keiki Co., Ltd., provided with a Shore D type spring hardness tester prescribed in ASTM-D2240 was used to measure the surface hardness of the center and the core, respectively. Shore D hardness measured at the surfaces of the center and the core were employed as the center surface hardness and the core surface hardness. The core was cut into two hemispheres to obtain a cut plane, and a Shore D hardness measured at the central point of the cut plane was employed as the central hardness of the core (central hardness of the center).

(2) Slab Hardness (Shore D Hardness)

Sheets with a thickness of about 2 mm were produced by injection molding the envelope layer composition and cover composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(3) Compression Deformation Amount (mm)

A compression deformation amount of the center, core or golf ball (a shrinking amount of the center, core, or golf ball in the compression direction thereof), when applying a load from 98 N as an initial load to 1275 N as a final load to the center, core or golf ball, was measured.

(4) Rebound Resilience (%)

A sheet with a thickness of about 2 mm was produced by a hot press molding the center composition. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50 RH %). Preparation of the test piece and the testing method are based on JIS K6255.

(5) Coefficient of Restitution

A 198.4 g of metal cylindrical object was forced to collide with each golf ball at a speed of 40 m/sec, and the speeds of the cylindrical object and the golf ball before and after the collision were measured. Based on these speeds and the mass of each object, coefficient of restitution for each golf ball was calculated. The measurement was conducted by using twelve samples for each golf ball, and the average value was regarded as the coefficient of restitution for the golf ball. The coefficient of restitution for golf ball No. 5 was defined as an index of 100, and the coefficient of restitutions for golf balls No. 1 to No. 7 were represented by converting the coefficient of restitutions for the golf balls in to this index. The coefficient of restitution for golf ball No. 12 was defined as an index of 100, and the coefficient of restitutions for golf balls No. 8 to No. 14 were represented by converting the coefficient of restitutions for the golf balls in to this index.

(6) Spin Rate on Approach Shots (Controllability)

The spin rates (rpm) were measured on about 40 yard-approach shots which ten testers having a handicap of 10 or less hit from the fairway in the golf course. The measurement was conducted by hitting each golf ball with a CG15 forged wedge (58°) manufactured by Cleveland Golf. A sequence of photographs of the hit golf ball were taken for measuring the spin rate (rpm). The average value of the ten testers is regarded as the spin rate (rpm).

[Production of Golf Balls]
(1) Production of Center

As shown in Tables 1 and 2, the blending materials were dry blended, followed by mixing with a twin-screw kneading extruder to extrude the blended material in the strand form into the cool water. The extruded strand was cut with a pelletizer to prepare a center composition in the form of pellet. Extrusion was performed in the following conditions: screw diameter: 45 mm; screw revolutions=200 rpm; and screw L/D=35. The mixtures were heated to a temperature in a range from 160° C. to 230° C. at a die position of the extruder. The obtained center composition in the form of pellet was injection molded at a temperature of 220° C. to prepare spherical centers.

Materials used in Tables 1 and 2 are follows.

HIMILAN AM7327: Zinc ion neutralized ethylene-methacrylic acid-butyl acrylate ternary copolymer ionomer resin (Melt Flow Rate (190° C., 2.16 kg): 0.7 g/10 min, Bending stiffness: 35 MPa) available from Du Pont-Mitsui Polychemicals Co., Ltd.

TABLE 1

| | | | | Golf ball No. | | | | | | |
|---|---|---|---|---|---|---|---|---|---|---|
| | | | | 1 | 2 | 3 | 4 | 5 | 6 | 7 |
| Center composition | Formulation (parts by mass) | (A) | Himilan AM7327 (Zn) | — | — | 100 | 100 | 100 | 100 | — |
| | | | Nucrel AN4319 | 100 | 100 | — | — | — | — | — |
| | | | Himilan AM7329 (Zn) | — | — | — | — | — | — | 33 |
| | | | Surlyn 8945 (Na) | — | — | — | — | — | — | 33 |
| | | | Rabalon T3221C | — | — | — | — | — | — | 34 |
| | | (B) | Basic Mg oleate (metal content: 1.7 mole %) | 30 | — | — | — | — | — | — |
| | | | Basic Mg oleate (metal content: 1.4 mole %) | — | — | 30 | — | — | — | — |
| | | | Basic Mg laurate/oleate (metal content: 1.3 mole %) | — | 70 | — | 30 | — | — | — |
| | | | Mg Oleate | — | — | — | — | 30 | — | — |
| | Properties | | Slab hardness (shore D) | 43 | 46 | 46 | 46 | 42 | 43 | 44 |
| | | | Rebound resilience (%) | 67 | 66 | 68 | 69 | 60 | 48 | 59 |
| | | | Center diameter (mm) | 15 | 15 | 15 | 15 | 15 | 15 | 15 |
| | | | Center center hardness (Shore D) | 42 | 45 | 44 | 45 | 41 | 43 | 44 |
| | | | Center surface hardness (Shore D) | 44 | 47 | 47 | 47 | 43 | 44 | 45 |
| Envelope layer | | | Envelope layer thickness (mm) | 12.4 | 12.4 | 12.4 | 12.4 | 12.4 | 12.4 | 12.4 |
| Core | | | Core surface hardness (Shore D) | 60 | 60 | 60 | 60 | 60 | 60 | 60 |
| Inner cover layer | | | Inner cover layer thickness (mm) | 1.0 | 1.0 | 1.0 | 1.0 | 1.0 | 1.0 | 1.0 |
| Outer cover layer | | | Outer cover layer thickness (mm) | 0.5 | 0.5 | 0.5 | 0.5 | 0.5 | 0.5 | 0.5 |
| Golf ball features | | | Compression deformation amount (mm) | 2.31 | 2.29 | 2.29 | 2.29 | 2.33 | 2.32 | 2.31 |
| | | | Coefficient restitution | 100.8 | 100.7 | 100.9 | 101.0 | 100.0 | 98.4 | 99.7 |
| | | | Spin rate on Approach shots (rpm) | 4690 | 4950 | 5010 | 5080 | 4130 | 3840 | 3910 |

TABLE 2

| | | | | Golf ball No. | | | | | | |
|---|---|---|---|---|---|---|---|---|---|---|
| | | | | 8 | 9 | 10 | 11 | 12 | 13 | 14 |
| Center composition | Formulation (parts by mass) | (A) | Himilan AM7327 (Zn) | — | — | 100 | 100 | 100 | 100 | — |
| | | | Nucrel AN4319 | 100 | 100 | — | — | — | — | — |
| | | | Himilan AM7329 (Zn) | — | — | — | — | — | — | 33 |
| | | | Surlyn 8945 (Na) | — | — | — | — | — | — | 33 |
| | | | Rabalon T3221C | — | — | — | — | — | — | 34 |
| | | (B) | Basic Mg oleate (metal content: 1.7 mole %) | 30 | — | — | — | — | — | — |
| | | | Basic Mg oleate (metal content: 1.4 mole %) | — | — | 30 | — | — | — | — |
| | | | Basic Mg laurate/oleate (metal content: 1.3 mole %) | — | 70 | — | 30 | — | — | — |
| | | | Mg Oleate | — | — | — | — | 30 | — | — |
| | Properties | | Slab hardness (shore D) | 43 | 46 | 46 | 46 | 42 | 43 | 44 |
| | | | Rebound resilience (%) | 67 | 66 | 68 | 69 | 60 | 48 | 59 |
| | | | Center diameter (mm) | 20 | 20 | 20 | 20 | 20 | 20 | 20 |
| | | | Center center hardness (Shore D) | 42 | 45 | 44 | 45 | 41 | 43 | 44 |
| | | | Center surface hardness (Shore D) | 44 | 47 | 47 | 47 | 43 | 44 | 45 |
| Envelope layer | | | Envelope layer thickness (mm) | 9.9 | 9.9 | 9.9 | 9.9 | 9.9 | 9.9 | 9.9 |
| Core | | | Core surface hardness (Shore D) | 60 | 60 | 60 | 60 | 60 | 60 | 60 |
| Inner cover layer | | | Inner cover layer thickness (mm) | 1.0 | 1.0 | 1.0 | 1.0 | 1.0 | 1.0 | 1.0 |
| Outer cover layer | | | Outer cover layer thickness (mm) | 0.5 | 0.5 | 0.5 | 0.5 | 0.5 | 0.5 | 0.5 |
| Golf ball features | | | Compression deformation amount (mm) | 2.34 | 2.31 | 2.31 | 2.31 | 2.36 | 2.34 | 2.33 |
| | | | Coefficient restitution | 100.7 | 100.6 | 100.8 | 100.9 | 100.0 | 98.3 | 99.4 |
| | | | Spin rate on Approach shots (rpm) | 4710 | 5010 | 5120 | 5200 | 4170 | 3830 | 3990 |

HIMILAN AM7329: Zinc ion neutralized ethylene-methacrylic acid copolymer ionomer resin (Melt Flow Rate (190° C., 2.16 kg): 5 g/10 min, Bending stiffness: 221 MPa) available from Du Pont-Mitsui Polychemicals Co., Ltd.

Nucrel AN4319: Ethylene-methacrylic acid-butyl acrylate copolymer (Melt flow rate (190° C., 2.16 kg): 55 g/10 min, Bending stiffness: 21 MPa) available from Du Pont-Mitsui Polychemicals Co., Ltd.

Surlyn 8945: Sodium ion neutralized ethylene-methacrylic acid copolymer ionomer resin (Melt Flow Rate (190° C., 2.16 kg): 4.8 g/10 min, Bending stiffness: 272 MPa) available from E.I. du Pont de Nemours and Company Basic magnesium oleate: Nitto kasei Kougyo Co., Ltd. (metal content: 1.7 mole %, in the formula (1), $M^1=M^2=Mg$, R=17 carbon atoms)

Basic magnesium oleate: Nitto kasei Kougyo Co., Ltd. (metal content: 1.4 mole %, in the formula (1), $M^1=M^2=Mg$, R=17 carbon atoms)

Basic magnesium laurate/oleate: Nitto kasei Kougyo Co., Ltd. (metal content: 1.3 mole %, in the formula (1), $M^1=M^2=Mg$, R=11, 17 carbon atoms, lauric acid/oleic acid=80/20 (mass ratio))

Magnesium oleate: Nitto kasei Kougyo Co., Ltd.

(2) Production of Core

The envelope layer composition having the formulation shown in Table 3 was molded into a half hollow-shells, covering the spherical center with the two half hollow-shells. The center and half hollow-shells were charged into upper and lower molds, each having a hemispherical cavity, and heated at the temperature of 150° C. for 20 minutes to obtain the spherical cores. The content of barium sulfate contained in the rubber composition was adjusted appropriately to make the center and envelope layer have the same density, as well as to make the resultant core have a mass of 45.4 g.

TABLE 3

| Envelope layer composition | Formulation (parts by mass) |
| --- | --- |
| Polybutadiene rubber | 100 |
| Zinc acrylate | 35 |
| Zinc oxide | 5 |
| Dicumyl peroxide | 0.9 |
| Diphenyl disulfide | 0.5 |
| Barium sulfate | Appropriate amount *) |

*) Barium sulfate: The amount is adjusted to make the resultant golf ball have a mass of 45.4 g.

Materials used in Table 3 are as follows.
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Dicumyl peroxide: "Percumyl (registered trademark) D" manufactured by NOF Corporation.
Diphenyl disulfide: Sumitomo Seika Chemicals Co., Ltd.

(3) Preparation of Cover Composition

The materials shown in Table 4 were mixed using a twin-screw kneading extruder to obtain the inner cover layer composition and the outer cover layer composition in the form of pellet. The extrusion of the inner cover layer composition was conducted in the following conditions: screw diameter=45 mm, screw revolutions=200 rpm, screw L/D=35, and cylinder temperature=160° C. to 230° C. The extrusion of the outer cover layer composition was conducted in the following conditions: screw diameter=45 mm, screw revolution=200 rpm, and screw L/D=35. The blends were heated to from 160° C. to 230° C. at the die position of the extruder.

TABLE 4

| Material | Inner cover layer composition | Outer cover layer composition |
| --- | --- | --- |
| Himilan 1605 | 50 | — |
| Himilan AM7329 | 50 | — |
| Elastollan XNY85A | — | 100 |
| Titanium oxide | 4 | 4 |
| Slab hardness (Shore D) | 65 | 32 |

Himilan 1605: Ionomer resin of a sodium ion-neutralized ethylene-methacryic acid copolymer, available from MITSUI-DUPONT POLYCHEMICAL
Himilan AM7329: Ionomer resin of a zinc ion-neutralized ethylene-methacrylic acid copolymer, available from MITSUI-DUPONT POLYCHEMICAL
Elastollan XNY85A: Thermoplastic polyurethane elastomer, available from BASF Japan Cp., Ltd.
Titanium oxide: A220, available from Ishihara Sangyo Kaisha, Ltd.

(4) Production of Inner Cover Layer

The inner cover layer composition obtained above was injection-molded onto the core to form the inner cover layer covering the core. Upper and lower molds have a spherical cavity with pimples, a part of which serves as a hold pin which is extendable and retractable.

When molding the inner cover layer, the hold pin was protruded to hold the core, and the inner cover layer composition heated and melted at the temperature of 260° C. was charged into a mold held under the pressure of 80 ton for 0.3 second. After cooling for 30 seconds, the mold was opened and the golf ball with the inner cover molded was taken out from the mold.

The adhesive layer was formed by coating a two-component thermosetting resin on the inner cover layer. A base resin of the two-component thermosetting resin is a water-based epoxy composition available from Shinto Paint Co., Ltd. The base resin includes 36 parts by mass of a bisphenol A epoxy resin and 64 parts by mass of water. Epoxy equivalent of the base resin is 1405 g/eq. A curing agent is a water-based amine composition available from Shinto Paint Co., Ltd. The curing agent includes 44 parts by mass of modified polyamideamine, 50 parts by mass of water, 1 part by mass of propylene glycol and 5 parts by mass of titanium dioxide. Active hydrogen equivalent of the curing agent is 348 g/eq. The adhesive layer was obtained by coating the adhesive layer composition on the surface of the inner cover layer with a spray gun and being kept under the temperature of 23° C. for 12 hours. The adhesive layer had a thickness of 0.003 mm. The gel fraction of the two-component thermosetting resin was 64 mass ° A).

(5) Molding of Half Shells

Compression molding of half shells were performed by, charging one pellet of the cover composition obtained as described above into each of depressed parts of lower molds for molding half shells, and applying pressure to mold half shells. Compression molding was performed at a temperature of 170° C. for 5 minutes under a molding pressure of 2.94 MPa.

(6) Molding of Outer Cover Layer

The inner cover layer obtained in (4) was covered with the two half shells obtained in (5) in a concentric manner, and the outer cover layer was molded by compression molding. Compression molding was conducted at a temperature of 145° C. for 2 minutes under a molding pressure of 9.8 MPa.

The surface of the obtained golf ball bodies were subjected to a sandblast treatment, and marking, and then clear paint was applied thereto and dried in an oven at a temperature of 40° C. to obtain golf balls having a diameter of 42.8 mm and a mass of 45.4 g. The performance of the obtained golf balls was evaluated, and results thereof are also shown in Tables 1 to 2.

As is apparent from Tables 1 and 2, the multi-piece golf balls comprising a core composed of a center and an envelope layer covering the center and at least one cover covering the core, wherein the center is formed from a center composition containing (A) at least one resin component selected from the group consisting of (a-1) a binary copolymer composed of an olefin and an α,β-unsaturated carboxylic acid having 3 to 8 carbon atoms; (a-2) an ionomer resin consisting of a metal ion-neutralized product of a binary copolymer composed of an olefin and an α,β-unsaturated carboxylic acid having 3 to 8 carbon atoms; (a-3) a ternary copolymer composed of an olefin, an α,β-unsaturated carboxylic acid having 3 to 8 carbon atoms and an α,β-unsaturated carboxylic acid ester; and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester, and (B) a basic metal salt of a fatty acid, and the envelope layer is formed from a rubber composition have an excellent resilience and controllability.

The present invention is useful for a multi-piece golf ball. This application is based on Japanese Patent application No. 2011-289987 filed on Dec. 28, 2011, the contents of which are hereby incorporated by reference.

What is claimed is:

1. A multi-piece golf ball comprising a core composed of a center and an envelope layer covering the center and at least one cover covering the core, wherein the center is formed from a center composition containing:
    (A) at least one resin component selected from the group consisting of
        (a-1) a binary copolymer composed of an olefin and an α,β-unsaturated carboxylic acid having 3 to 8 carbon atoms,
        (a-2) an ionomer resin consisting of a metal ion-neutralized product of a binary copolymer composed of an olefin and an α,β-unsaturated carboxylic acid having 3 to 8 carbon atoms,
        (a-3) a ternary copolymer composed of an olefin, an α,β-unsaturated carboxylic acid having 3 to 8 carbon atoms and an α,β-unsaturated carboxylic acid ester, and
        (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester and
    (B) a basic metal salt of a fatty acid, wherein the center composition contains (B) the basic metal salt of the fatty acid in an amount range of from 25 parts to 100 parts by mass with respect to 100 parts by mass of (A) the resin component, and
    wherein the basic metal salt of the fatty acid is represented by the following general formula (1):
    $$mM^1O.M^2(RCOO)_2 \quad (1)$$
    wherein m ranges from 0.3 to 2.0, RCOO represents a residue of the fatty acid, and $M^1$ and $M^2$ are magnesium,
    wherein the center and surface of the core differ in hardness such that the surface has a hardness that is 10 or more in Shore D higher than the center, and
    wherein the envelope layer is formed from a rubber composition.

2. The multi-piece golf ball according to claim 1, wherein (B) the basic metal salt of the fatty acid is a basic metal salt of a fatty acid having 8 to 30 carbon atoms.

3. The multi-piece golf ball according to claim 1, wherein a fatty acid component of (B) the basic metal salt of the fatty acid is at least one component selected from the group consisting of lauric acid, stearic acid, behenic acid, oleic acid, and erucic acid.

4. The multi-piece golf ball according to claim 1, wherein the center composition has a slab hardness ranging from 20 to 80 in Shore D hardness.

5. The multi-piece golf ball according to claim 1, wherein the center has a diameter ranging from 5 mm to 30 mm.

6. The multi-piece golf ball according to claim 1, wherein the center composition has a rebound resilience of 40% or more.

7. The multi-piece golf ball according to claim 1, wherein the envelope layer has a thickness in a range from 0.5 mm to 20 mm.

8. The multi-piece golf ball according to claim 1, wherein the core has a surface hardness in a range from 40 to 70 in Shore D hardness.

9. The multi-piece golf ball according to claim 1, wherein the cover comprises at least two layers.

10. The multi-piece golf ball according to claim 1, wherein the cover consists of an inner cover layer covering the core and an outer cover layer covering the inner cover layer.

11. The multi-piece golf ball according to claim 10, wherein the inner cover layer contains an ionomer resin and the outer cover layer contains polyurethane.

12. The multi-piece golf ball according to claim 1, wherein the center composition contains (B) the basic metal salt of the fatty acid in an amount range of from 25 parts to 70 parts by mass with respect to 100 parts by mass of (A) the resin component.

13. The multi-piece golf ball according to claim 1, wherein m ranges from 0.4 to 2.0.

14. The multi-piece golf ball according to claim 1, wherein m ranges from 0.7 to 2.0.

* * * * *